US008489812B2

(12) United States Patent
Chavda et al.

(10) Patent No.: US 8,489,812 B2
(45) Date of Patent: Jul. 16, 2013

(54) AUTOMATED STORAGE PROVISIONING WITHIN A CLUSTERED COMPUTING ENVIRONMENT

(75) Inventors: Kavita Chavda, Roswell, GA (US); David P. Goodman, Loveland, CO (US); Sandeep Gopisetty, Morgan Hill, CA (US); Larry S. McGimsey, Mead, CO (US); James E. Olson, Seymour, CT (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 12/915,153

(22) Filed: Oct. 29, 2010

(65) Prior Publication Data
US 2012/0110260 A1  May 3, 2012

(51) Int. Cl.
*G06F 12/00* (2006.01)
(52) U.S. Cl.
USPC ........... 711/114; 711/112; 711/148; 711/152; 711/154; 711/158; 711/161; 711/162; 711/165; 711/206
(58) Field of Classification Search
USPC ................. 711/112, 114, 148, 152, 154, 158, 711/161, 162, 165, 206
See application file for complete search history.

(56) References Cited

U.S. PATENT DOCUMENTS

| 5,163,131 | A | 11/1992 | Row et al. |
| 6,018,567 | A | 1/2000 | Dulman |
| 7,209,964 | B2 | 4/2007 | Dugan et al. |
| 2004/0138938 | A1 | 7/2004 | Quintus et al. |
| 2008/0307178 | A1* | 12/2008 | Agombar et al. ............ 711/162 |
| 2009/0198703 | A1 | 8/2009 | Ezzat et al. |
| 2009/0240809 | A1* | 9/2009 | La Frese et al. ............ 709/226 |
| 2009/0300210 | A1 | 12/2009 | Ferris |
| 2010/0042720 | A1 | 2/2010 | Stienhans et al. |
| 2010/0050172 | A1 | 2/2010 | Ferris |
| 2010/0070237 | A1 | 3/2010 | Yitbarek et al. |
| 2010/0082931 | A1* | 4/2010 | Hatfield ..................... 711/166 |
| 2011/0047329 | A1* | 2/2011 | O'Rourke et al. ........... 711/113 |
| 2011/0185147 | A1* | 7/2011 | Hatfield et al. .............. 711/170 |
| 2012/0011316 | A1* | 1/2012 | Chavda et al. ............... 711/114 |

OTHER PUBLICATIONS

Maitland, J., "Keeping Control Isn't Easy", Chapter 4: Cloud-Based Infrastructure, SearchCloudcomputing.com, 13 pages.
Mell, et al., "The NIST Definition of Cloud Computing", National Institute of Standards and Technology, Information Technology Laboratory, Version 15, Oct. 7, 2009, 2 pages.

* cited by examiner

*Primary Examiner* — Reginald Bragdon
*Assistant Examiner* — Mehdi Namazi
(74) *Attorney, Agent, or Firm* — William E. Schiesser; Keohane & D'Alessandro, PLLC

(57) ABSTRACT

An approach for automatic storage planning and provisioning within a clustered computing environment is provided. Planning input for a set of storage area network volume controllers (SVCs) will be received within the clustered computing environment, the planning input indicating a potential load on the SVCs and its associated components. Analytical models (e.g., from vendors) can be also used that allow for a load to be accurately estimated on the storage components. Configuration data for a set of storage components (i.e., the set of SVCs, a set of managed disk (Mdisk) groups associated with the set of SVCs, and a set of backend storage systems) will also be collected. Based on this configuration data, the set of storage components will be filtered to identify candidate storage components capable of addressing the potential load. Then, performance data for the candidate storage components will be analyzed to identify an SVC and an Mdisk group to address the potential load.

20 Claims, 6 Drawing Sheets

AUTOMATED STORAGE PROVISIONING WITHIN A CLUSTERED COMPUTING ENVIRONMENT

TECHNICAL FIELD

The present invention generally relates to a clustered computing environment such as a cloud computing environment. Specifically, the present invention relates to automated storage provisioning within a clustered computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices, networks, business applications and other software, and the like.

As part of managed storage services, a storage service provider maintains and manages the storage infrastructure for an enterprise customer. To maintain a flexible storage infrastructure for multiple clients, managed storage services offerings typically use storage virtualization. Whenever a customer desires an update to its storage service, a manual workflow is executed involving creating a ticket, notifying the architect, and deployment of personnel who then execute the change. Such heavy manual involvement can be very challenging for large scale infrastructures and incurs significant cost. It also makes planning a labor intensive task.

SUMMARY

Embodiments of the present invention provide an approach for automatic storage planning and provisioning within a clustered computing environment (e.g., a cloud computing environment). Specifically, embodiments of the present invention will receive planning input for a set of storage area network volume controllers (SVCs) within the clustered computing environment, the planning input indicating a potential load on the SVCs and its associated components. Along these lines, analytical models (e.g., from vendors) can be also used that allow for a load to be accurately estimated on the storage components. Regardless, configuration data for a set of storage components (i.e., the set of SVCs, a set of managed disk (Mdisk) groups associated with the set of SVCs, and a set of backend storage systems) will also be collected. Based on this configuration data, the set of storage components will be filtered to identify candidate storage components capable of handling/addressing the potential load. Then, performance data for the candidate storage components will be analyzed to identify an SVC and an Mdisk group to handle/address the potential load. This allows for storage provisioning planning to be automated in a highly accurate fashion.

A first aspect of the present invention provides a method for automated storage provisioning in a clustered computing environment, comprising: receiving planning input for a set of storage area network volume controllers (SVCs) within the clustered computing environment, the planning input indicating a potential load on the SVCs; collecting configuration data for a set of storage components, the set of storage components comprising the set of SVCs, a set of managed disk (Mdisk) groups associated with the set of SVCs, and a set of backend storage systems associated with the set of Mdisk groups; filtering the set of storage components based on the configuration data to identify candidate storage components capable of handling the potential load; and analyzing performance data for the candidate storage components to identify an SVC and an Mdisk group to handle the potential load.

A second aspect of the present invention provides a system for automated storage provisioning in a clustered computing environment, comprising: a bus; a processor coupled to the bus; and a memory medium coupled to the bus, the memory medium comprising instructions to: receive planning input for a set of storage area network volume controllers (SVCs) within the clustered computing environment, the planning input indicating a potential load on the SVCs; collect configuration data for a set of storage components, the set of storage components comprising the set of SVCs, a set of managed disk (Mdisk) groups associated with the set of SVCs, and a set of backend storage systems associated with the set of Mdisk groups; filter the set of storage components based on the configuration data to identify candidate storage components capable of handling the potential load; and analyze performance data for the candidate storage components to identify an SVC and an Mdisk group to handle the potential load.

A third aspect of the present invention provides a computer program product for automated storage provisioning in a clustered computing environment, the computer program product comprising a computer readable storage media, and program instructions stored on the computer readable storage media, to: receive planning input for a set of storage area network volume controllers (SVCs) within the clustered computing environment, the planning input indicating a potential load on the SVCs; collect configuration data for a set of storage components, the set of storage components comprising the set of SVCs, a set of managed disk (Mdisk) groups associated with the set of SVCs, and a set of backend storage computer program products associated with the set of Mdisk groups; filter the set of storage components based on the configuration data to identify candidate storage components capable of handling the potential load; and analyze performance data for the candidate storage components to identify an SVC and an Mdisk group to handle the potential load.

A fourth aspect of the present invention provides a method for deploying a system for automated storage provisioning in a clustered computing environment, comprising: providing a computer infrastructure having functionality to: receive planning input for a set of storage area network volume controllers (SVCs) within the clustered computing environment, the planning input indicating a potential load on the SVCs; collect configuration data for a set of storage components, the set of storage components comprising the set of SVCs, a set of managed disk (Mdisk) groups associated with the set of SVCs, and a set of backend storage computer program products associated with the set of Mdisk groups; filter the set of storage components based on the configuration data to identify candidate storage components capable of handling the potential load; and analyze performance data for the candidate storage components to identify an SVC and an Mdisk group to handle the potential load.

BRIEF DESCRIPTION OF THE DRAWINGS

These and other features of this invention will be more readily understood from the following detailed description of the various aspects of the invention taken in conjunction with the accompanying drawings in which.

Figure 1:
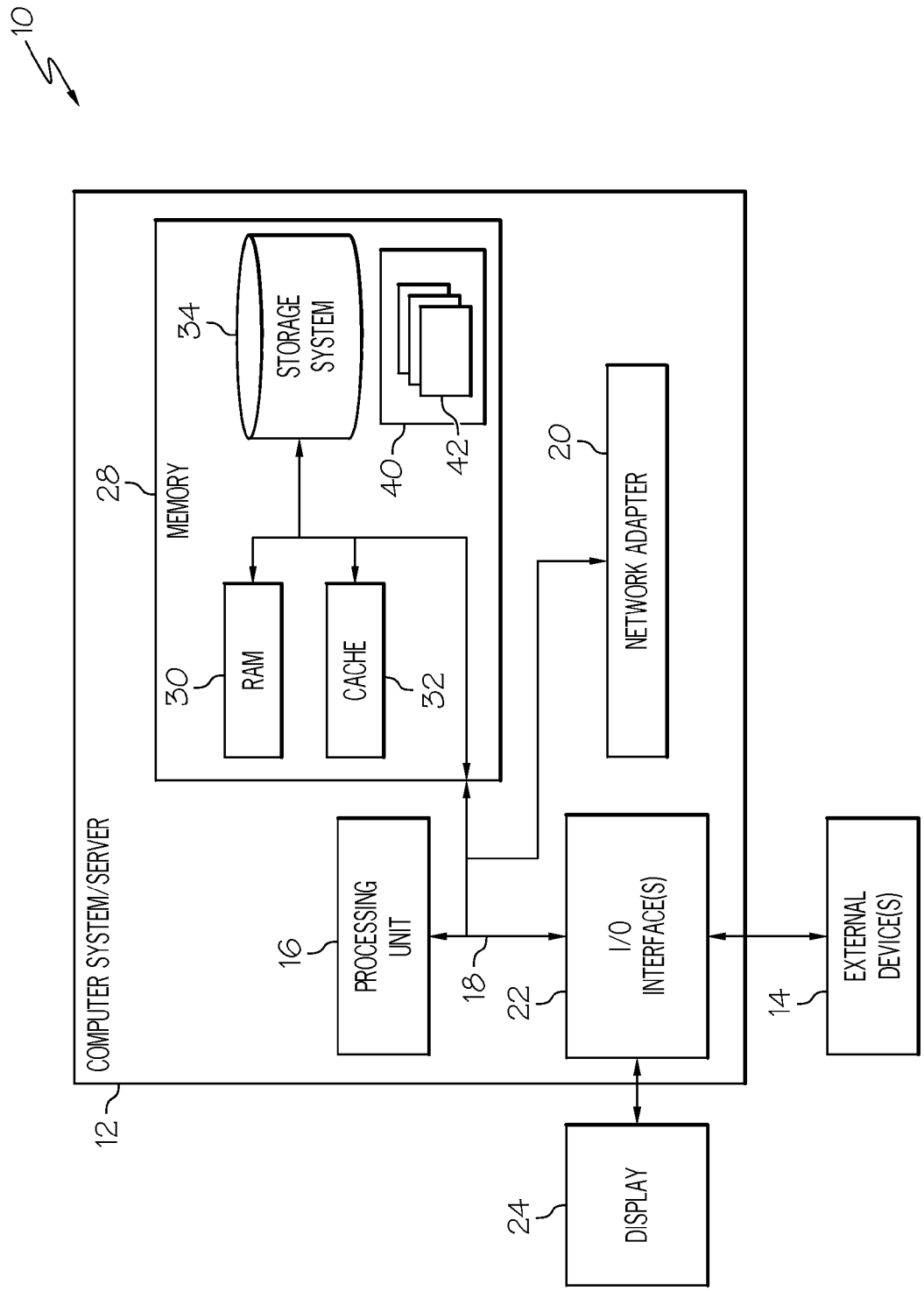
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or It is understood in advance that although this disclosure includes a detailed description on cloud computing, implementation of the teachings recited herein are not limited to a cloud computing environment. Rather, embodiments of the present invention are capable of being implemented in conjunction with any other type of clustered computing environment now known or later developed.

In any event, as indicated above, embodiments of the present invention provide an approach for automatic storage planning and provisioning within a clustered computing environment (e.g., a cloud computing environment). Specifically, embodiments of the present invention will receive planning input for a set of storage area network volume controllers (SVCs) within the clustered computing environment, the planning input indicating a potential load on the SVCs and its associated components. Along these lines, analytical models (e.g., from vendors) can be also used that allow for a load to be accurately estimated on the storage components. Regardless, configuration data for a set of storage components (i.e., the set of SVCs, a set of managed disk (Mdisk) groups associated with the set of SVCs, and a set of backend storage systems) will also be collected. Based on this configuration data, the set of storage components will be filtered to identify candidate storage components capable of addressing the potential load. Then, performance data for the candidate storage components will be analyzed to identify an SVC and an Mdisk group to address the potential load. This allows for storage provisioning planning to be automated in a highly accurate fashion.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Automated storage provisioning program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) systems, tape drives, and data archival storage systems, etc.

Figure 2:
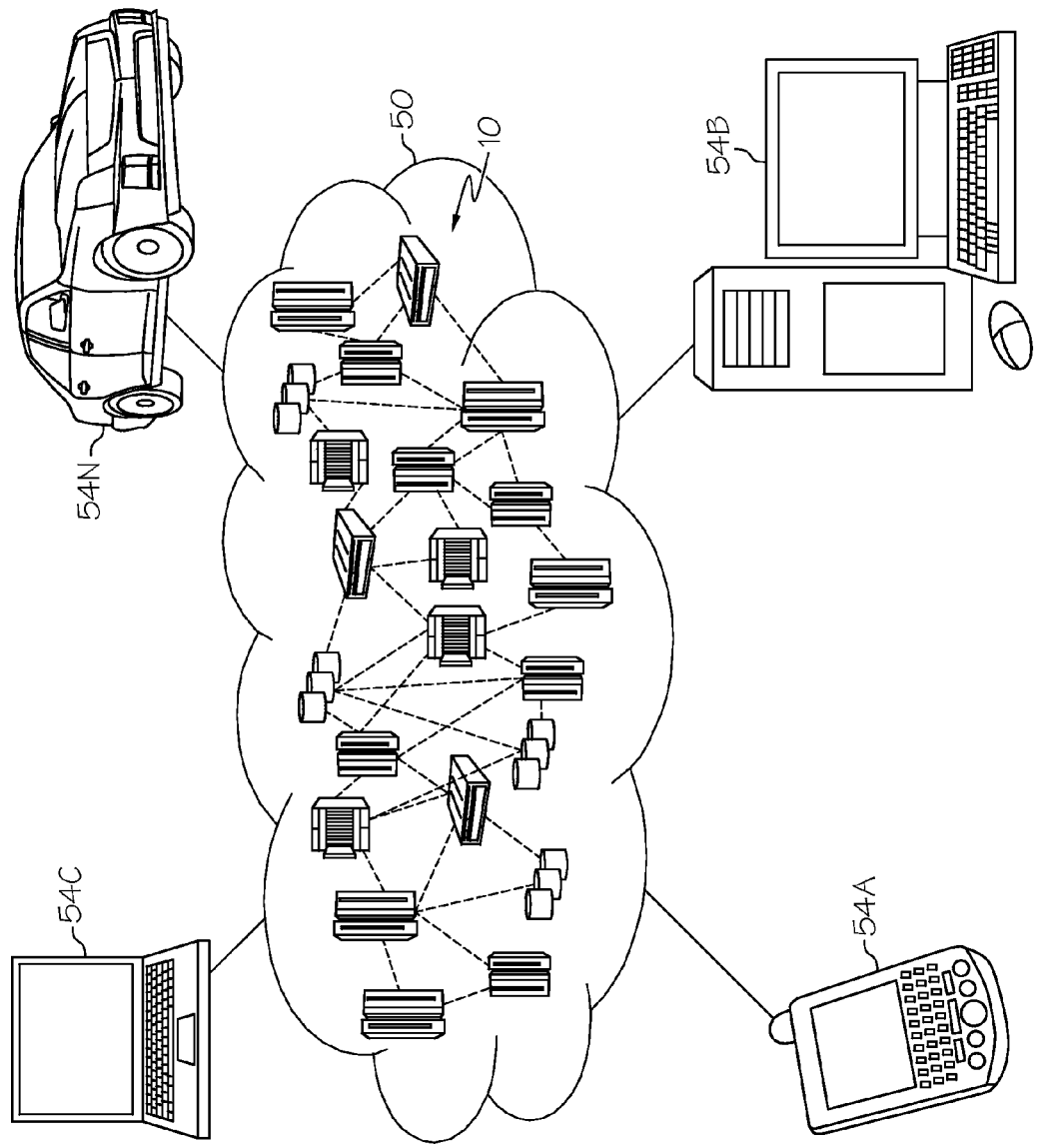
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
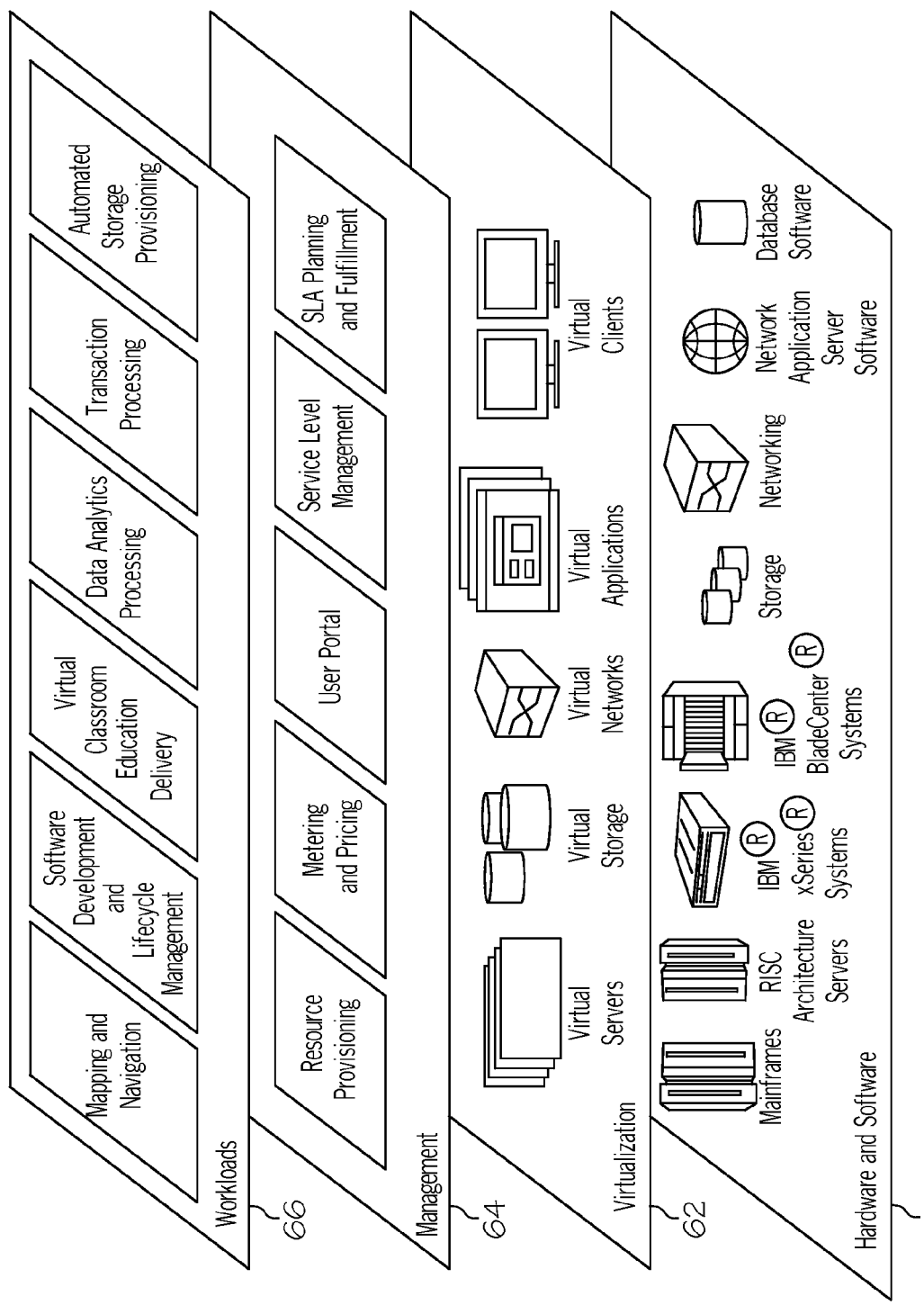
FIG. 3 depicts cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated storage provisioning.

It is understood all functions of the present invention as described herein are typically performed by the automated storage provisioning function, which can be tangibly embodied as modules of program code 42 of automated storage provisioning program/utility 40 (FIG. 1). However, this need not be the case. Rather, the functionality recited herein could be carried out/implemented and/or enabled by any of the layers 60-66 shown in FIG. 2.

Figure 4:
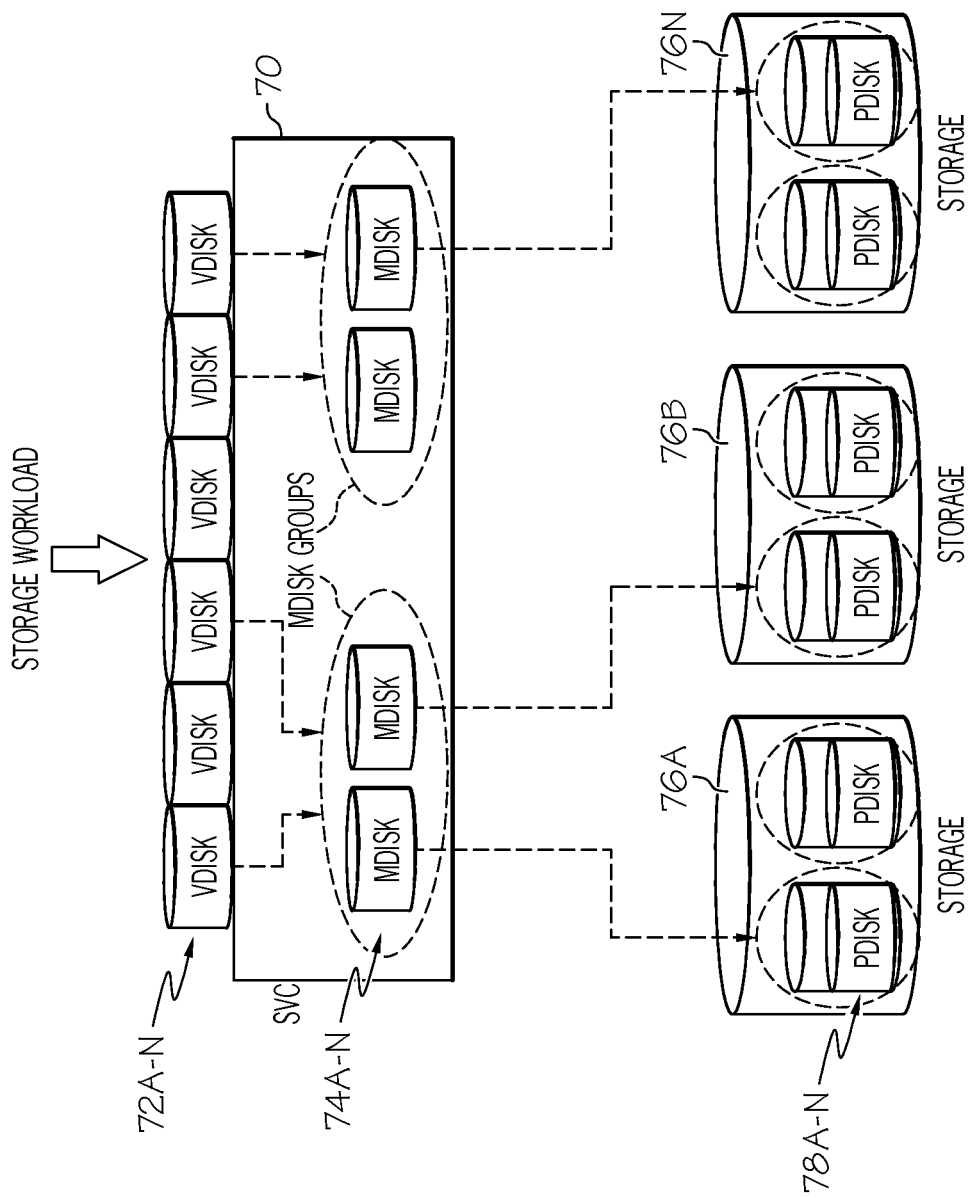
FIG. 4 depicts a set of storage area network volume controllers (SVCs) and associated storage components according to an embodiment of the present invention.

Referring now to FIG. 4, a set of storage area network volume controllers (SVCs) 70 according to an embodiment of the present invention is shown. As depicted, SVC 70 includes a set (at least one) of virtual storage disks (vdisks) 72A-N, and a set of managed storage disks (Mdisks) 74A-N. As further shown, Mdisk groups 74A-N are associated with backend storage systems 76A-N, that can comprise one or more pdisks 78A-N. Under embodiments of the present invention, module (s) 42 of automated storage provisioning program/utility 40 automatically plan and provision storage usage for future (e.g., estimated/potential) loads. Among other things, ideal SVCs, Mdisk groups, and back-end-storage systems (collectively referred to as storage components) will be identified for handling potential loads. These potential loads are estimated using planning input and/or analytical models. Ideal storage components for handling the potential loads are identified based on, among other things, configuration data and performance data.

Figure 5:
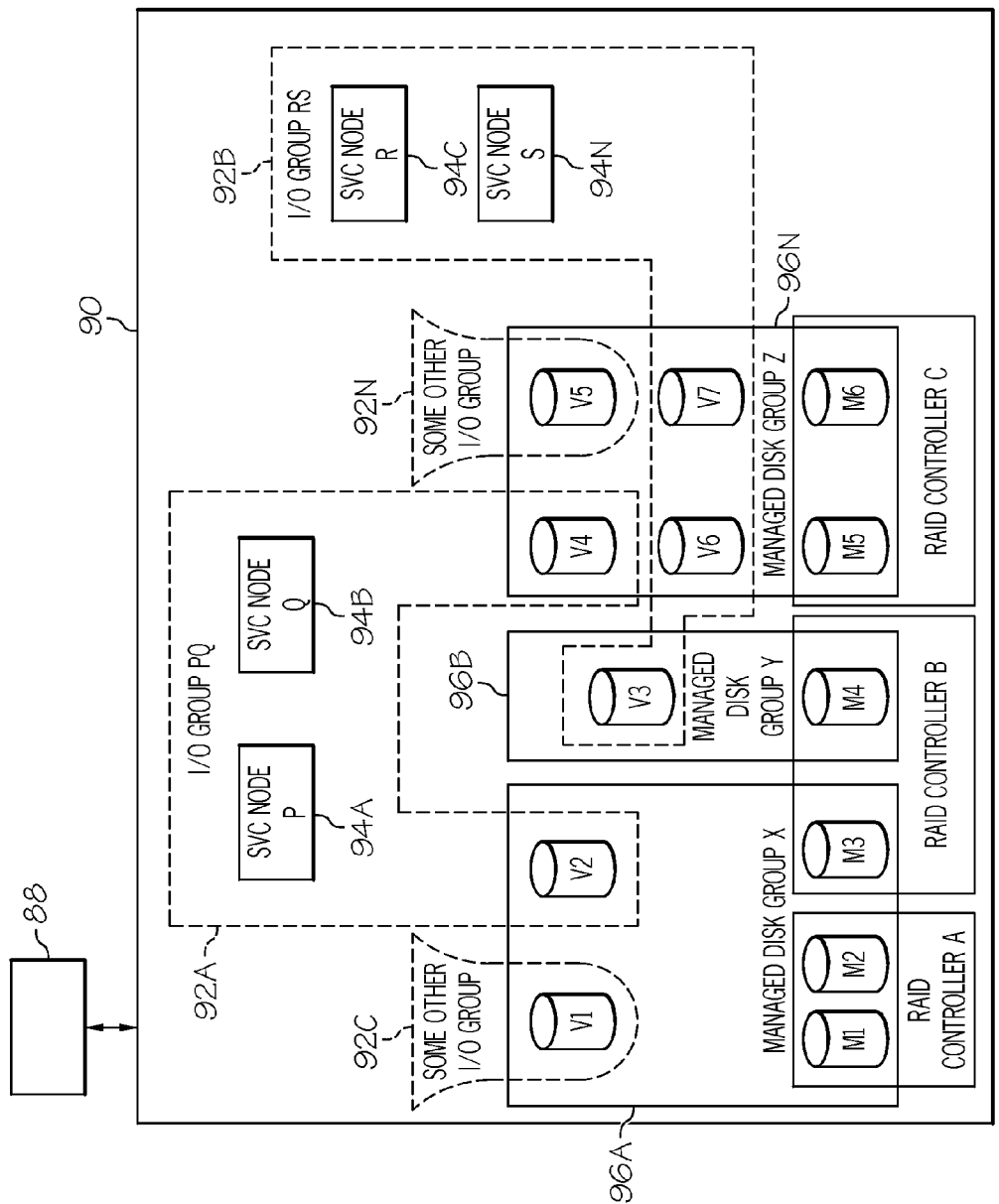
FIG. 5 depicts the selection of storage components according to an embodiment of the present invention.

Referring now to FIG. 5, these concepts will be explained in further detail. Under embodiments of the present invention, various storage components such as an Input/Output (I/O)

group, an SVC, an Mdisk group and/or a backend storage system will be identified for storing a predicted/potential storage load. As depicted, embodiments of the present invention can provide a set of I/O groups 92A-N. As further shown, I/O groups (e.g., I/O groups 92A-B) can comprise one or more SVC nodes 94A-N. Regardless, each I/O group typically comprises a set of vdisks V1-V7. Still yet, each Mdisk group 96A-N is typically Redundant Array of Independent Disks (RAID) controlled and comprises a set of Mdisks M1-M6. RAID controllers A-C can be considered backend storage systems hereunder.

In a typical embodiment, SVC 90 resides within a clustered computing environment such as cloud computing environment 50 (FIG. 2). Along these lines, it will first be determined whether SVC 90 is accessible from a host 88 that will likely need access to storage. It should be understood that although a single SVC 90 is shown in FIG. 5, this need not be the case. Rather, the teachings recited herein are intended to apply to an environment having any quantity of accessible SVCs (e.g., at least one or a "set"). Regardless, assuming in this example that SVC 90 is in fact accessible to host 88, modules 42 of automated storage provisioning program/utility 40 will first predict a potential (storage) load using planning input data. In a typical embodiment, such data can include the following: required capacity, workload profile, historical data, RAID levels, etc. The planning input allows modules 42 to predict the potential load that will be needed. Once the potential load has been predicted, modules 42 will then collect configuration data (e.g., RAID level, thin-provisioning support, encryption support, connectivity to servers, etc.) for the storage components. The storage components are then filtered based on the configuration data to identify candidate storage components capable of handling the potential load. Specifically, the configuration data will indicate whether a particular storage component can handle its part of the potential load.

Once the group of storage components has been filtered to leave only candidates that are capable of handling the potential load, modules 42 will collect and analyze performance data (e.g., read I/O rate, write I/O rate, total I/O rate, read data rate, write data rate, total data rate, response times (read, write, overall), cache hit rates, etc.) for each of the candidate storage groups (i.e., candidate SVCs, Mdisk groups, backend storage systems, etc.). This will allow the field of candidates to be further narrowed to a single I/O group, SVC and Mdisk group, as well as at least one backend storage system for handling the potential load. Based on this "final" selection; modules 42 can then generate a plan for handling the potential load including: a timing of data storage, whether to shift to different storage components after a certain period of time, whether data should be mirrored on other storage components, etc. In general, analytical models (e.g., E.g. DiskMagic models for SVC subsystem, or a DS8000 storage subsystem) can be used to compute a utilization of the set of SVCs and the set of Mdisk groups, while using backend storage models (e.g., analytical models for backend storage subsystems) to compute a utilization of the set of backend storage systems. In general, the models have an API, where if workloads are fed to the subsystem, it responds with expected performance data based on the subsystem configuration. Regardless, these computations can occur at any point in the process described herein. In any event, these plans can then be outputted in a report format or the like. In a typical embodiment, modules 42 can include and/or have access to a rules engine or the like that can generate plans based on input, configuration data, performance data, models, etc.

Figure 6:
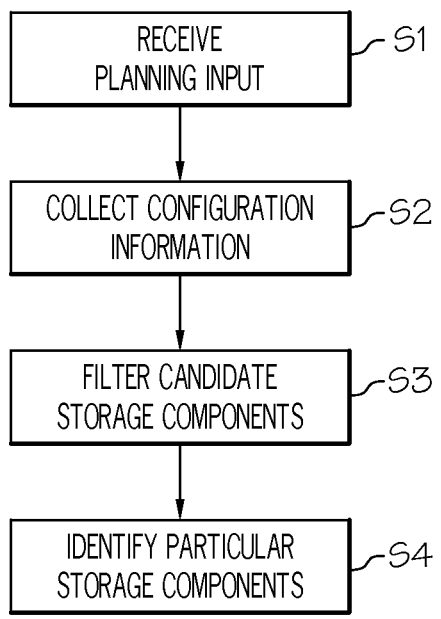
FIG. 6 depicts a method flow diagram according to an embodiment of the present invention.

Referring now to FIG. 6, a method flow diagram according to the present invention is shown. As depicted, in step S1, planning input for a set of storage area network volume controllers (SVCs) within a clustered computing environment is received. As indicated above, the planning input indicates a potential load on the SVC. In step S2, configuration data for a set of storage components is selected. As used herein, the term storage components can collectively refer to one or more of the following device types: I/O groups, SVCs, Mdisk groups associated with the set of SVCs, and/or a backend storage system associated with the set of Mdisk groups. Regardless, in step S3, the set of storage components is then filtered based on the configuration data to identify candidate storage components capable of handling the potential load. In step S4, performance data for the candidate storage components is analyzed to identify an SVC and an Mdisk group to handle the potential load. Based on this analysis, a plan can be generated for handling the potential load.

While shown and described herein as an automated storage provisioning solution, it is understood that the invention further provides various alternative embodiments. For example, in one embodiment, the invention provides a computer-readable/useable medium that includes computer program code to enable a computer infrastructure to provide automated storage provisioning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide automated storage provisioning. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing automated storage provisioning functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for automated storage provisioning in a clustered computing environment, comprising:
   receiving planning input for a set of storage area network volume controllers (SVCs) within the clustered computing environment, the planning input indicating a potential load on the SVCs;
   collecting configuration data for a set of storage components, the set of storage components comprising the set of SVCs, a set of managed disk (Mdisk) groups associated with the set of SVCs, and a set of backend storage systems associated with the set of Mdisk groups;
   filtering the set of storage components based on the collected configuration data to identify candidate storage components capable of handling the potential load; and
   analyzing performance data for the candidate storage components to identify an SVC and an Mdisk group to handle the potential load.

2. The method of claim 1, further comprising generating a plan for handling the potential load based on the analyzing and the planning input.

3. The method of claim 2, the generating comprising using SVC analytical models to compute a utilization of the set of SVCs and the set of Mdisk groups.

4. The method of claim 3, the generating further comprising using backend storage models to compute a utilization of the set of backend storage systems.

5. The method of claim 1, the analyzing further comprising analyzing the performance data to identify a backend storage system of the set of backend storage systems based on the Mdisk group identified.

6. The method of claim 1, the analyzing further comprising analyzing the performance data to identify an I/O group.

7. A system for automated storage provisioning in a clustered computing environment, comprising:
   a bus;
   a processor coupled to the bus; and
   a memory medium coupled to the bus, the memory medium comprising instructions to:
   receive planning input for a set of storage area network volume controllers (SVCs) within the clustered computing environment, the planning data indicating a potential load on the SVCs;
   collect configuration data for a set of storage components, the set of storage components comprising the set of SVCs, a set of managed disk (Mdisk) groups associated with the set of SVCs, and a set of backend storage systems associated with the set of Mdisk groups;
   filter the set of storage components based on the collected configuration data to identify candidate storage components capable of handling the potential load; and
   analyze performance data for the candidate storage components to identify an SVC and an Mdisk group to handle the potential load.

8. The system of claim 7, the memory medium further comprising instructions to generate a plan for handling the potential load based on the planning input and the performance data.

9. The system of claim 8, the memory medium further comprising instructions to use SVC analytical models to compute a utilization of the set of SVCs and the set of Mdisk groups.

10. The system of claim 9, the memory medium further comprising instructions to use backend storage models to compute a utilization of the set of backend storage systems.

11. The system of claim 7, the memory medium further comprising instructions to analyze the performance data to identify a backend storage system of the set of backend storage systems based on the Mdisk group identified.

12. The system of claim 7, the memory medium further comprising instructions to analyze the performance data to identify an I/O group.

13. A computer program product for automated storage provisioning in a clustered computing environment, the computer program product comprising a non-transitory computer readable storage media, and program instructions stored on the non-transitory computer readable storage media, to:
   receive planning input for a set of storage area network volume controllers (SVCs) within the clustered computing environment, the planning input indicating a potential load on the SVCs;
   collect configuration data for a set of storage components, the set of storage components comprising the set of SVCs, a set of managed disk (Mdisk) groups associated with the set of SVCs, and a set of backend storage computer program products associated with the set of Mdisk groups;
   filter the set of storage components based on the collected configuration data to identify candidate storage components capable of handling the potential load; and
   analyze performance data for the candidate storage components to identify an SVC and an Mdisk group to handle the potential load.

14. The computer program product of claim 13, further comprising program instructions stored on the non-transitory computer readable storage media to generate a plan for handling the potential load based on the planning input and the performance data.

15. The computer program product of claim 14, further comprising program instructions stored on the non-transitory computer readable storage media to use SVC analytical models to compute a utilization of the set of SVCs and the set of Mdisk groups.

16. The computer program product of claim 13, further comprising program instructions stored on the non-transitory computer readable storage media to use backend storage models to compute a utilization of the set of backend storage computer program products.

17. The computer program product of claim 13, further comprising program instructions stored on the non-transitory computer readable storage media to identify a backend storage computer program product of the set of backend storage computer program products based on the Mdisk group identified.

18. The computer program product of claim 13, further comprising program instructions stored on the non-transitory computer readable storage media to analyze the performance data to identify an I/O group.

19. A method for deploying a system for automated storage provisioning in a clustered computing environment, comprising:

providing a computer infrastructure having functionality to:
   receive planning input for a set of storage area network volume controllers (SVCs) within the clustered computing environment, the planning input indicating a potential load on the SVCs;
   collect configuration data for a set of storage components, the set of storage components comprising the set of SVCs, a set of managed disk (Mdisk) groups associated with the set of SVCs, and a set of backend storage computer program products associated with the set of Mdisk groups;
   filter the set of storage components based on the collected configuration data to identify candidate storage components capable of handling the potential load; and
   analyze performance data for the candidate storage components to identify an SVC and an Mdisk group to handle the potential load.

20. The method of claim 19, the computer infrastructure being further operable to generate a plan for handling the potential load based on the planning input and the performance data.

\* \* \* \* \*